Patented May 9, 1933

1,908,550

UNITED STATES PATENT OFFICE

CYRIL J. STAUD AND HENRY B. SMITH, OF ROCHESTER, NEW YORK, ASSIGNORS TO EASTMAN KODAK COMPANY, OF ROCHESTER, NEW YORK, A CORPORATION OF NEW YORK.

PROCESS FOR THE MANUFACTURE OF CELLULOSE ACETATE

No Drawing.    Application filed February 15, 1929.    Serial No. 340,321.

This invention relates to cellulose acetate and particularly to a method of producing cellulose acetate in a dry pulverulent condition.

Cellulose acetate is produced by the action of acetylating agents on cellulose in the presence of catalysts such as zinc chloride. The reaction mixture may, for example, comprise cellulose acetate, acetic anhydride, acetic acid and zinc chloride. The cellulose acetate may be recovered, for example, by spray drying as described in the United States patent to Webb No. 1,516,225. When zinc chloride is used as a catalyzer, the product recovered by spray drying has a tendency to become gummy, a condition which makes it unsuitable for further treatment and therefore unsatisfactory.

It is the object of the present invention to avoid the difficulty experienced in spray drying cellulose acetate and particularly to produce dry powdered cellulose acetate which is free from gumminess and other undesirable characteristics and likewise to increase the surface area per unit weight of the material.

We have discovered that the effect of zinc chloride in the drying operation can be overcome by the addition to the reaction mixture of certain compounds containing ammonia, which forms with the zinc a zinc ammonium complex. In the spray drying operation, the cellulose acetate, prior to spraying, is dissolved in an acetic acid and water solution. These volatile constituents are removed from the cellulose acetate by a rapid stream of warm air with which they come in contact on entering the spray drying chamber. The cellulose acetate and non-volatile salts contained therein, such as zinc chloride, settle to the floor of the chamber in a finely divided form. A portion of the water vaporized from the reaction mixture is absorbed by the zinc chloride. Moisture in the air entering the chamber when the spray dried cellulose acetate is removed therefrom also combines with the precipitated zinc chloride present. The zinc chloride therefore becomes syrupy and the particles of this gummy material act as an adhesive to cement together the cellulose acetate powder grains in the immediate vicinity, with the resulting formation of plastic gummy adhesive masses of cellulose acetate and zinc chloride which are very difficult to wash. These masses also occlude acetic acid which requires a more expensive washing operation.

If an ammonium salt be added to the reaction mixture, prior to spray drying, however, a zinc ammonium chloride is formed which is unlike zinc chloride in that it is practically non-hygroscopic. This salt, therefore, does not absorb the moisture from the spray drying chamber, with the result that the small particles of cellulose acetate remain in a dry and pulverulent condition. This results in more rapid and easy washing of the spray dried material. The finely divided state also aids in further operation such as dissolving in suitable solvents for the formation of dopes and lacquers for various commercial purposes.

The use of ammonium carbonate in the present invention is to be preferred to that of ammonium acetate in that the same effect is obtained in regard to the conversion of the hygroscopic zinc chloride into the non-hygroscopic zinc ammonium chloride, and, in addition, the carbon dioxide produced as a result of the reaction causes an "explosion" or "bursting" of the powder grains as they are formed in the spray drying chamber. This action increases the ratio of the surface per unit weight of the spray dried material; whereby the salts in the subsequent washing operation are more readily removed. Moreover, the introduction of carbon dioxide into the acetic acid air stream decreases the ever-present explosion hazard of the process.

It may be further stated that the bursting of the powder grains is a very real phenomenon in this procedure as may be indicated by photomicrographs. The grains produced in the usual way appear as spheres with hollow centers through the surface of which diffusion of liquids is slow. After being sprayed from a dope which contains ammonium carbonate, it is apparent that the spheres are converted into much finer irregular masses with little or no occlusion of the other reaction products.

Ammonium carbonate is volatile at the temperature to which the reaction mixture is subjected in spray drying, and consequently it is removed effectively from the product and does not appear therein. The addition of ammonium carbonate has the added advantage resulting from the decomposition of the carbonate and the liberation of carbon dioxide in the mixture. The carbon dioxide, under proper conditions, may be held in the mixture until it enters the spray chamber where it is released.

Ammonium acetate is not volatile at the temperature of the spray drying operation, but, in the relatively small quantity employed, is readily removed from the spray dried material in the subsequent washing operation, prior to its use in dope or lacquer compositions.

In carrying out the invention, we prefer to employ ammonium carbonate. It may be introduced to the reaction mixture in varying proportions, from approximately 37 grams to 200 grams for each 120 grams of zinc chloride in the reaction mixture. The limits mentioned are those best adapted to accomplish the purpose in commercial operation, but the purpose can be effected to a degree with a lower proportion of ammonium carbonate and a higher proportion does not necessarily affect the product adversely although it accomplishes no improved result.

In employing ammonium acetate we prefer to introduce approximately 7% by weight of ammonia to the acetic acid used in the reaction. The ammonia may be bubbled through the reaction mixture until the proportion indicated has been absorbed prior to the introduction of the mixture to the spray drier. Ammonium acetate is formed in the reaction mixture and prevents gumming of the powder resulting from the spray drying operation.

It will be understood that the examples indicated represent the preferred procedure and that the object can be accomplished by the similar use of other ammonium salts which readily react with the zinc chloride present to form the complex salt. The product produced by the practice of the invention is a dry powder, particles of which do not adhere to each other. The material has, consequently, no tendency to become lumpy and is adapted therefore for further treatment and use.

Various changes may be made in the details of the procedure as described without departing from the invention or sacrificing any of its advantages.

Having thus described our invention, what we claim as new and desire to secure by Letters Patent is:

1. A method of preventing gumminess in spray dried cellulose acetate powders, the cellulose acetate initially containing zinc chloride, which comprises adding an ammonium salt to the mixture in solution and then spray drying.

2. A method of preventing gumminess in spray dried cellulose acetate powders, the cellulose acetate initially containing zinc chloride, which comprises adding ammonium carbonate to the mixture in solution and then spray drying.

3. A method of preventing gumminess in spray dried cellulose acetate powders which comprises adding 37–200 parts of ammonium carbonate per 120 parts of zinc chloride present.

4. A method of preventing gumminess in spray-dried cellulose acetate powders, the cellulose acetate initially containing zinc chloride, which comprises adding ammonia to a solution containing the cellulose acetate, acetic acid and zinc chloride and then spray drying.

5. A method of preventing gumminess in spray-dried cellulose acetate powders, the cellulose acetate initially containing zinc chloride, which comprises adding ammonium acetate to a solution containing the cellulose acetate and zinc chloride, and then spray drying.

6. A method of preventing gumminess in spray-dried cellulose acetate powders, which comprises adding to a completed reaction bath a compound selected from the group of compounds having available ammonia consisting of ammonia, ammonium carbonate and ammonium acetate, and then spray drying.

Signed at Rochester, New York, this 8th day of February, 1929.

CYRIL J. STAUD.
HENRY B. SMITH.